Figure 1:
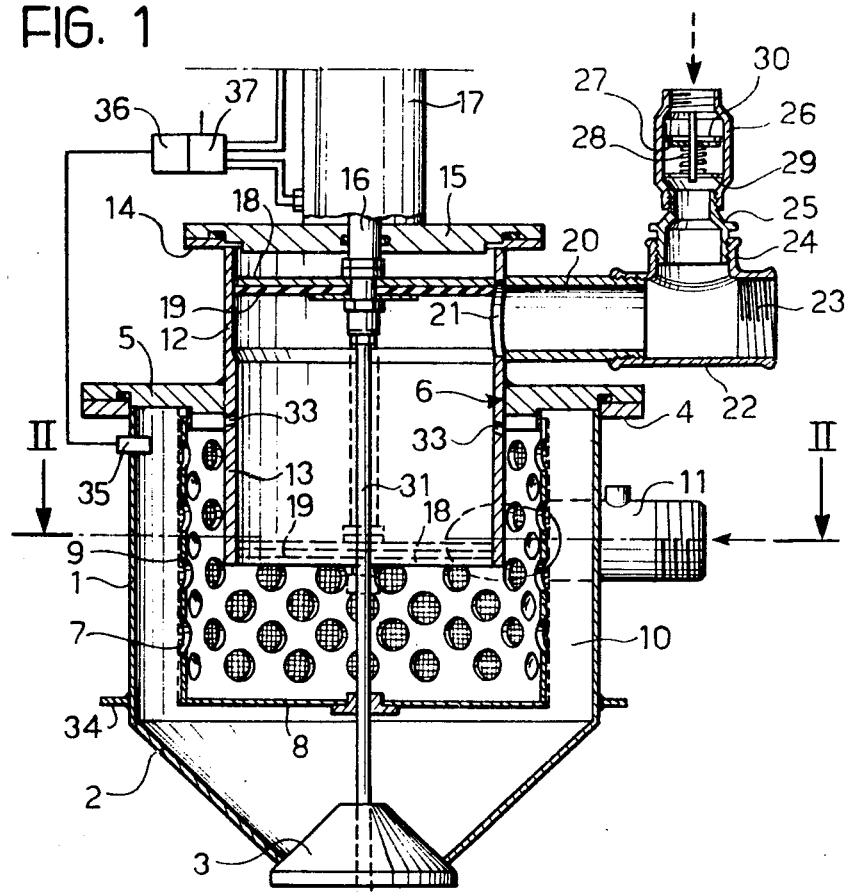

United States Patent [19]

Galletti

[11] 4,271,019

[45] Jun. 2, 1981

[54] FILTER UNIT FOR USE IN LIQUID PURIFICATION APPARATUS

[75] Inventor: Alfonso Galletti, Turin, Italy

[73] Assignee: Gi. Pi. S.n.c. di Galletti Alfonso & C., Turin, Italy

[21] Appl. No.: 66,101

[22] Filed: Aug. 13, 1979

[30] Foreign Application Priority Data

Oct. 13, 1978 [IT] Italy .................. 69365 A/78

[51] Int. Cl.³ ............................................. B01D 23/26
[52] U.S. Cl. ........................................ 210/108; 210/304; 210/411; 210/512.1
[58] Field of Search .................. 210/108, 304, 333 R, 210/335.4, 354, 393, 409, 411, 425, 512 R

[56] References Cited

U.S. PATENT DOCUMENTS

| | | | |
|---|---|---|---|
| 3,067,876 | 12/1962 | Hruhy, Jr. ................. | 210/512 R |
| 3,443,696 | 5/1969 | Schutte ..................... | 210/304 |
| 3,834,535 | 9/1974 | Portyrata ................... | 210/108 |
| 3,853,762 | 12/1974 | Moatti ....................... | 210/108 |
| 4,046,692 | 9/1977 | Brautmann ................ | 210/411 |
| 4,162,549 | 7/1979 | Charles et al. ............ | 210/411 |

FOREIGN PATENT DOCUMENTS

999678 10/1976 Italy ........................................ 210/407

*Primary Examiner*—Theodore A. Granger
*Attorney, Agent, or Firm*—Sughrue, Rothwell, Mion, Zinn and Macpeak

[57] ABSTRACT

A filter unit comprises an outer casing defining a vertical-axis first chamber having a liquid inlet and a normally-closed discharge valve at its lower end and a second chamber defined by upper and lower end walls, a perforated cylindrical wall located within the first chamber and covered by a filter element and a non-perforated cylindrical wall having a lower portion coaxial with, and within the perforated wall and an upper portion projecting above the first chamber and having an outlet for liquid filtered through the filter element. A piston is slidable within the non-perforated wall to force liquid through the filter element to cleanse the latter when it becomes clogged, the piston being connected to open the discharge valve to discharge the particle-containing liquid from the first chamber. A non-return valve in a duct connected to the outlet allows air into the space above the piston to facilitate its descent.

2 Claims, 2 Drawing Figures

FILTER UNIT FOR USE IN LIQUID PURIFICATION APPARATUS

The present invention relates to a filter unit for use in liquid-purification equipment, especially equipment for filtering liquid coolants from machine tools which contain solid particles.

More particularly, the invention relates to a filter unit of the aforesaid type including a filter element interposed between a first chamber, having an inlet for liquid to be filtered by the unit, and a second chamber having an outlet for liquid filtered through the filter element, and especially to such a filter unit in which the filter element is not replaced frequently but is cleansed when it becomes clogged with particles to such an extent that it reduces, or actually prevents, the passage of liquid therethrough, and in which, as a rule, this cleansing is effected by a counterflow of the filtered liquid through the filter element.

Filter units are already known (e.g. from Italian Pat. No. 999,678 filed on the 25.10.1973, and granted on 10.3.1976) in which this cleansing operation is carried out automatically as soon as the filter element has reached a predetermined degree of clogging. In these filter units the first chamber is arranged with its axis vertical and a normally-closed discharge valve is provided at its lower end. The second chamber is coaxial with the first chamber, is closed at its upper and lower ends and is defined by a cylindrical wall having a perforated section, located within the first chamber and covered by the filter element, and a non-perforated portion which projects above the top of the first chamber and is provided with the outlet for the purified liquid filtered through the filter element.

A piston is assembled in the second chamber for axial sliding movement therein and is fixed to a rod which controls the opening of the said discharge valve in the first chamber. The piston is itself driven by an actuator mounted above the second chamber, the actuator being controlled by a pressure switch sensitive to the pressure in the first chamber. The switch and actuator are arranged to lower the piston in the second chamber when the pressure in the first chamber increases to a predetermined value, due in practice to a build-up of particles on the filter element. The lowering of the piston causes the filtered liquid in the second chamber to flow back through the filter element, cleansing the latter of the particles deposited thereon, into the first chamber. The piston simultaneously opens the discharge valve so that the particle-containing liquid is discharged from the first chamber. The piston is then returned to its initial, upper position as the pressure falls in the first chamber, with consequent closure of the discharge valve and restoration of the filter unit to normal operation.

In known filters of this type, the upper portion of the cylindrical wall which defines the second chamber is an extension of the lower perforated section of the wall located within the first chamber. Since the piston must be able to move a relatively large volume of liquid in order to ensure efficient cleansing of the filter element in its downward stroke, and since the diameter of this piston has to be contained within reasonable limits if the use of an excessively high-powered control actuator is to be avoided, it is essential for the piston stroke, and hence the second chamber, to be relatively long. This means that not only the upper portion of the chamber wall, but also the actuator, and hence the overall axial length of the whole apparatus, must be inconveniently extensive.

In such filters it is also desirable for the perforated section of the second chamber wall within the first chamber to have as extensive a surface as possible in order to allow an abundant flow of liquid through the filter element during normal operation of the unit so as to increase the time interval between cleansing operations. Clearly the filter unit described in the above cited Italian Patent is not wholly satisfactory from this point of view since an increase in the area of the filter element could only be obtained by increasing the length of the perforated wall section as it is impractical to increase the diameter of the wall for the reasons cited above.

An object of the present invention is, therefore, to provide a filter unit of the type described above which is more compact axially than known filters of this type but which allows substantially the same volume of filtered liquid to be forced through the filter element in the cleansing operation and which has, at the same time, a greater area of filter element than such known filter units.

According to the present invention there is provided a filter unit comprising: a casing defining a first, closed chamber arranged with its axis vertical, in use, and having an inlet for particle-containing liquid to be filtered by the unit and a normally-closed discharge valve at its lower end; a second chamber, coaxial with the first chamber and having an outlet for liquid filtered by the unit, the second chamber being defined by upper and lower end walls, a nonperforated cylindrical wall projecting beyond the upper end, in use, of the first chamber, and a perforated cylindrical wall covered by a filter element and located within the first chamber; a piston slidable in the second chamber and connected to the discharge valve of the first chamber by a rod, and; a control actuator located above the second chamber and connected to the piston to drive the latter so as to expel liquid from the second chamber through the filter element into the first chamber, in counterflow to the normal flow of the liquid in use, to cleanse the filter, and simultaneously to open the discharge valve to expel particle-containing liquid from the first chamber; characterised in that the said perforated wall has a greater diameter than the non-perforated cylindrical wall and the latter has a portion which extends within the perforated wall.

In a preferred embodiment of the invention at least one aperture is provided in the portion of the non-perforated cylindrical wall within the perforated wall and adjacent an upper annular end wall which closes the annular portion of the second chamber between the perforated and non-perforated walls, and in a further preferred embodiment the outlet from the second chamber is connected through an outlet pipe to a pipe union which opens to the atmosphere through a duct containing a non-return valve, the valve being openable to allow air to flow therethrough into the pipe union.

Figure 2:
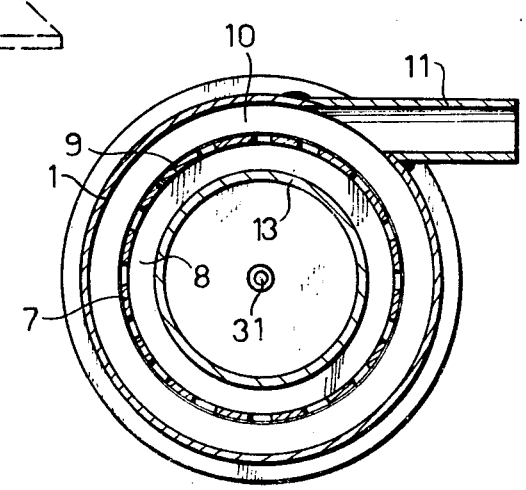

One embodiment of the invention will now be more particularly described, by way of example, with reference to the accompanying drawings, in which;

FIG. 1 is a diagrammatic axial sectional view of a filter unit according to the invention, and FIG. 2 is a cross-sectional view taken on line II—II of FIG. 1.

Referring to the drawings, the filter unit according to the invention has an outer casing comprising a cylindrical wall 1 arranged with its axis vertical and a frusto-conical wall 2 sealed to the lower edge of the wall 1 along its edge of greater diameter. The lower aperture defined by the wall 2 is closable by a frusto-conical valve body 3, shown in its closed position in full outline in FIG. 1 and in its open position in broken outline. The upper edge of the cylindrical wall 1 is provided with a radially-outwardly extending annular flange 4 to which is sealed the outer periphery of an annular wall 5, coaxial with the casing 1, and having a central, circular aperture 6.

Within, and coaxial with, the cylindrical wall 1 is a further cylindrical, perforated wall 7, of diameter intermediate that of the aperture 6 and the wall 1. The upper end of the wall 7 is sealed to the wall 5 while the lower end is closed by a circular closure disc 8, parallel to the wall 5. The outer surface of the wall 7 is covered by a filter element 9 comprising a perforated sheet, for example a mesh or woven fabric made of metal or of a suitable synthetic resin; the size of the perforations depend on the nature and size of the particles which the filter element is to retain, in use.

The space within the filter casing, defined by the walls 1, 2 and 5 and the valve body 3, and the filter element 9 and disc 8 constitutes a first chamber 10 of the filter unit. A conduit 11, adapted at one end to be connected to the outlet of a pump (not illustrated) opens into the first chamber 10 through the cylindrical wall 1 of the casing such that, in use, liquid to be purified can be fed under pressure by the pump into the chamber 10.

Within the aperture 6 of the wall 5 is fitted, and welded to the edge of the aperture 6, a cylindrical sleeve having a lower section 13, which projects downwardly within the perforated wall 7 and an upper section 12 which projects above the level of the wall 5. The upper end of the section 12 of the sleeve is closed by a circular disc 15 sealed to an annular flange 14 provided at the upper end of the sleeve section 12. The lower end of the section 13 is open.

The space within the perforated wall 7 and the sleeve 12, 13 and bounded by the cover 15, the disc 8 and the annular section of the wall 5 between the walls 7 and 13, defines a second chamber of the filter unit.

The cover 15 has a central through-bore in which is located, for axial sliding movement therein, a shaft 16 of a double-acting actuator 17 which is assembled on top of the cover 15. The lower end of the shaft 16 carries a piston head comprising a rigid disc 18 and a disc 19 of resilient material, of slightly greater diameter than the disc 18, and fixed below it. The piston assembly is a sliding fit within the sleeve 12, 13 and is shown in full outline in its upper end-of-stroke position, closely spaced below the disc 15, and in broken outline in its lower end-of-stroke position at the lower end of the sleeve 12, 13.

The piston shaft 16 projects slightly below the piston head 18, 19 and further carries a rod 31 which extends downwardly through a sealed aperture in the second closure disc 8 and is anchored at its lower end to the valve body 3. The length of the rod 31 is such that the valve 3 closes the lower aperture of the thrusto-conical wall 2 of the first chamber when the piston is at its upper end-of-stroke postion.

Immediately below the piston head 18, 19 in its uppermost position is an aperture 21 in the sleeve section 12. The internal diameter of the sleeve section 12 above the lowest point of the aperture 21 is, in fact, slightly larger than the diameter of the rest of the sleeve 12, 13, the disc 19 of the piston head co-operating with the lower section of the sleeve to ensure a liquid-tight seal but being slightly less than that of the uppermost section of the sleeve such that the space above the piston head 18, 19 in its uppermost position can communicate with the lower portion of the sleeve.

The outlet aperture 21 in the sleeve section 12 communicates with a short outlet pipe 20, one end of which is sealed to the periphery of the aperture 21 and the other end of which is connected to a pipe union 22. The union 22 has an outlet 23, adapted for connection to a reservoir tank (not illustrated) for receiving liquid filtered through the filter unit, and a branch 24 communicating through a connecting element 25 with one end of a tubular body 26 the other end of which is open to the atmosphere. The tubular body 26 contains a valve comprising a valve seat formed by an annular ridge 30 on the inner surface of the body adjacent to that end open to the atmosphere, and a disc 27 of resilient material which is urged against the valve seat to close the opening therein by a helical spring 28 which bears at its opposite end against a washer 29, again fixed to the tubular body 26. The valve is thus a non-return valve which can open to allow air into the tubular body but which prevents the outflow of liquid therethrough.

Although the sleeve 12, 13 is substantially unperforated, it is provided with a circle of holes 33 in the section 13 within the perforated wall 7 and immediately adjacent the wall 5. These holes 33 ensure that any air present in the second chamber is not trapped in the annular portion between the walls 13 and 7 when liquid flows into the chamber initially but can be expelled through the holes 33 into the interior of the sleeve 12, 13. The holes 33 may alternatively extend through the annular portion of the wall 5 located between the sleeve section 13 and the wall 7 as well as through the wall 13.

A further feature of the filter unit of the invention is a pressure switch 35 which is located in the wall 1 of the first chamber. The switch 35 is connected through a servo-control 36 to a distributor 37 which controls the operation of the actuator 17, the switch being adapted to generate an electrical pulse when the pressure in the first chamber 10 exceeds a predetermined threshold valve. Such a control system is known per se and will not, therefore, be described in detail, but is arranged to control the operation of the actuator 17 such that the shaft 16, and hence the piston 18, 19, takes up its upper postion, shown in unbroken lines, when the pressure in the first chamber 10 is less than the said threshold but is driven downwardly so that the piston 18, 19 reaches its lower end of stroke position, shown in broken lines, when the pressure in the chamber 1 exceeds this threshold.

In use, the filter unit described above is operated in association with auxiliary apparatus, such as an electric pump for feeding liquid to be filtered through the pipe 11 into the first chamber, a sedimentation tank for the larger particles, a tank for collecting the liquid filtered by the filter unit, and a further electric pump for pumping the filtered liquid on to apparatus in which it is to be used. This apparatus is known per se and is not therefore shown in the drawings and will not be described in detail. The filter unit described is, however, provided with an annular flange 34 fixed to the cylindrical wall 1 of the casing for use in mounting the filter unit in an aperture in a casing of the apparatus with which it is to be used.

The operation of the filter unit is as follows:

Liquid to be filtered in the apparatus is fed under pressure through the pipe 11 into the chamber 10 and passes through the filter element 9 and perforations in the wall 7 into the second chamber, the filter element retaining solid impurities in the first chamber. The area of the filter element and the rate of flow of liquid into the chamber 10 are such that, at this stage of operation of the unit, the pressure in the chamber 10 is less than the aforesaid threshold value. Thus the piston 18, 19 is retained in its uppermost position and the liquid filtered into the second chamber is able to flow out through the outlet 21 and duct 20 to the pipe union 22. The pressure of the liquid in the pipe union 22 assists in keeping the valve 27, 30 closed and the liquid flows out through the outlet 23 to the receiving tank (not shown).

During operation of the filter unit a deposit of the solid impurities builds up on the outer face of the filter element 9, clogging the filter element and reducing the flow of liquid therethrough. This results in a progressive increase of pressure in the first chamber 10 of the filter unit and when this pressure increases above the threshold value for which the pressure switch 35 is calibrated, the latter sends a pulse to the servo-control 36 which effects commutation of the distributor 37. the actuator 17 is thus operated to drive the downward motion of the shaft 16 and piston 18, 19 to its lower end-of-stroke position, driving liquid from the second chamber through the filter element 9 in the reverse direction to the normal flow therethrough and simultaneously opening the valve 3. This reverse flow of liquid through the filter element removes the solid particles therefrom, the particles and liquid in the first chamber 10 being discharged through the valve 3.

The downward stroke of the piston 18, 19 is rapid and is further facilitated by the opening of the valve 27, 30 due to the lowering of the pressure in the duct 20 and pipe union 22; this allows air to flow through the valve 27, 30 into the duct 20 and into the space above the piston 18, 19.

Discharge of liquid and solid impurities from the first chamber 10 through the discharge valve 3 results in a fall of pressure in the chamber to a value below the threshold. This fall is detected by the pressure switch 35 and, through the controls, 36, 37, results in the actuator 17 being actuated to drive the upward movement of the shaft 16 to withdraw the piston 18, 19 to its upper position and close the valve 3. The filter unit is thus returned to its normal operating condition, filtering continuing through the newly-cleansed filter element.

On return to normal operation, the pressure in the duct 20 and pipe union 22 increases, the valve 27, 30, closes and the air which had previously been drawn into this part of the apparatus is discharged through the outlet 23. Mixing of the air with the filtered liquid is beneficial as it causes regeneration of the liquid.

Although the automatic actuation of the piston has been described, a manual control may be provided as an alternative to, or in addition to, the controls 35, 36, 37.

What is claimed is:

1. A filter unit for filtering a particle-containing liquid, comprising:
   a casing, arranged with its axis vertical, and defining a first closed chamber and an inlet for said particle-containing liquid;
   a normally-closed discharge valve located in a lower part of said casing and arranged to discharge liquid from said first chamber;
   a perforated cylindrical wall located within, and coaxial with, said casing;
   a non-perforated cylindrical wall having a diameter less than said perforated cylindrical wall coaxially disposed within said perforated cylindrical wall and projecting above said perforated cylindrical wall and said casing;
   an annular wall closing the upper end of said casing and an annular chamber portion between said cylindrical walls;
   upper and lower end walls defining with said perforated cylindrical wall, said non-perforated cylindrical wall and said annular wall a second chamber, said non-perforated wall defining an outlet for liquid filtered by said filter unit;
   a filter element covering said perforated cylindrical wall and arranged to retain particles in said particle-containing liquid fed into the first chamber through the inlet and to allow substantially particle-free liquid to flow therethrough into the second chamber to be discharged through said outlet;
   a piston slidable axially within said second chamber;
   a rod connecting said piston to said discharge valve; and
   a control actuator located above said upper end wall of said second chamber and connected to said piston to drive the latter so as to expel liquid from said second chamber through said filter element, in counter-flow to the normal flow of liquid therethrough, to cleanse the filter element of particles retained thereon, and simultaneously to open said discharge valve to expel particle-containing liquid from said first chamber therethrough;
   said outlet from said second chamber being connected to a pipe union; a tubular body connected at one end thereof to said pipe union and at the other end thereof to define an opening to the atmosphere; and a non-return valve provided in said tubular body, said non-return valve being openable to allow air therethrough into said pipe union.

2. The filter unit of claim 1, wherein said non-perforated wall adjacent said annular wall defines at least one aperture which allows said annular chamber portion to communicate directly with the internal space defined by the non-perforated wall.

* * * * *